(12) United States Patent
Willis

(10) Patent No.: US 6,865,034 B1
(45) Date of Patent: Mar. 8, 2005

(54) METHOD AND APPARATUS FOR ELIMINATING ALIGNMENT ERROR IN AN OPTICAL SYSTEM

(75) Inventor: Chris L. Willis, Hollis, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 86 days.

(21) Appl. No.: 10/616,265

(22) Filed: Jul. 8, 2003

Related U.S. Application Data
(60) Provisional application No. 60/459,340, filed on Apr. 1, 2003.

(51) Int. Cl.[7] ............................. G02B 7/02; H01S 3/00
(52) U.S. Cl. ......................................... 359/820; 372/33
(58) Field of Search ................................ 359/813, 820; 372/33, 107

(56) References Cited

U.S. PATENT DOCUMENTS
4,649,274 A * 3/1987 Hartmann ................ 250/341.5

* cited by examiner

*Primary Examiner*—David N. Spector
(74) *Attorney, Agent, or Firm*—Daniel J. Long

(57) ABSTRACT

A system is provided for nulling out or eliminating alignment errors in an optical system by moving a lens to capture and center a collimated beam laterally-shifted by thermal excursions, thus to counteract the boresight error caused by the thermally-induced lateral shifting. As a result, alignment error the thermal coefficient of expansion characteristics of the optical elements and their mounting systems caused by lateral off-sets is corrected by moving a lens or lens system in response to thermal changes in a direction which moves the lens so that the collimated light impinging on the lens is made to come in on the optical axis of the lens.

14 Claims, 12 Drawing Sheets

METHOD AND APPARATUS FOR ELIMINATING ALIGNMENT ERROR IN AN OPTICAL SYSTEM

CROSS REFERENCE TO RELATED APPLICATION

This application claims rights under 35 U.S.C. 119(e) from U.S. patent application Ser. No. 60/459,340, filed Apr. 1, 2003.

FIELD OF INVENTION

This invention relates to optical systems and more particularly to a system which maintains alignment accuracy in the face of thermal variations.

BACKGROUND OF THE INVENTION

Many laser systems currently employ a number of optical elements especially in folded cavities used to shorten the cavity to a usable small size. It is important in such systems that the emitted laser beam be aligned with the optical axis of the system called the boresight axis. For many applications such as laser target designators and missile counter measures, alignment accuracy is critical and angular errors are to be kept below 250 microradians to assure that laser beams hit their targets. While such systems are aligned at room temperature, thermal excursions distort the associated optical benches and their components, and make it difficult to limit angular error. Thus when a beam is re-directed or passed through optical elements, it is important that thermal expansion or contraction does not cause an angular misalignment of the beam with the boresight axis of the equipment.

Laser systems such as ring lasers exist in which a laser beam is passed through a number of optical elements that support for instance Q-switching, amplification, output coupling, and polarization control. Other elements affect angular beam alignment, power monitoring, and beam diversion. Moreover, some of these devices are active devices in that they operate as optical parametric amplifiers or frequency doubling devices. Various elements of the optical system for re-directing the laser beams are intended to reduce sensitivity of the optical system to tilting motions of the optics and bending or twisting of the structure. These include for instance corner cubes, Porro prisms, and Dove prisms.

While it is the purpose of such devices to return a beam along an axis exactly parallel to the incident optical beam, no matter how the optic is tilted during operation, there is a little understood factor which causes subtle but large alignment problems relative to the above-stated boresight requirement. Thermal expansion of the optical bench can cause these devices to laterally shift their exit beams. Furthermore, these optics actually magnify the lateral shift. When these laterally-shifted beams are then focused, the result is a beam which is angularly displaced from the centerline of the focusing optics. Thus while the radiation exiting from a corner cube is returned parallel to the incident radiation, which would seem to be just exactly what one would want, it has been found that the laterally-shifted beam when focused causes the collimated beam to come out angularly shifted from the optical centerline of the lens.

What this means is that if a collimated beam impinges on a retroreflective device at a point on the surface of the device not on the optical centerline of the device due to thermally-induced lateral shifting, then while the returned beam will come out parallel to the incident beam, it's position in space will be laterally-shifted by an amount calculatable in terms of the thermal coefficient of expansion of the materials utilized.

When these components are followed by a lens, as they often are, or when the beams from these devices are introduced into a laser cavity having curved mirrors defining the cavity, then the effect of the lateral shift of the collimated beam is amplified. This is because the beam, instead of impinging directly on the center of a downstream lens, is off-set from the center of the lens. While the collimated beam is in fact still focused at the focal point of the lens, the direction of the beam that comes through the focal point is at an angle to the optical axis of the lens itself. This manifests itself as angular boresight error.

What this means is that the angular direction of an exiting beam is angularly shifted due to a lateral shift of the collimated beam ahead of the lens. When such optical systems are utilized, for instance, as laser target designators or target illuminators, then an angular shift of 250 microradians can cause target illumination or jamming beams to completely miss the intended target.

While the optical system may be aligned at room temperature, when temperature shifts occur one needs to be able to realign the exiting beam with the boresight axis and to do so automatically.

In the past, it has not been understood that the lateral shift of an optical retroreflective element due to thermal expansion causes such misalignment problems. With the realization that a lateral shift ahead of a lens results in angular error, it is incumbent upon the designer of the optical system to be able to provide a shift in the position of the lens so that when a thermal change occurs, the collimated light impinging on the lens is made to come in on the optical centerline of the lens, i.e. along its optical axis.

A failure to understand that a lateral shift in the collimated light impinging on a lens can result in an angular off-set of the exiting beam has led to frustration in the design of optical benches and optical systems which seem not to maintain initial alignment.

Considerable work has been focused on the coefficient of thermal expansion of the various components in the optical system, along with that of the optical bench, so that in theory as the optical bench expands with a thermal rise, there will be a theoretic null result and alignment will be maintained.

Work has also been directed towards providing optical bench materials and components having CTE's, coefficients of thermal expansions, close to one. However, these materials are excessively expensive, sometimes rust and in general are undesirable due to the inability to procure the materials themselves.

The result is that optical benches are made from aluminum, having a CTE for instance of 24 ppm/° C. It is then incumbent upon the designer of the optical system to be able to null out the effects of thermal expansion so that the angular error introduced by thermal expansion is minimized if not completely eliminated.

It will be appreciated, for instance, that an alignment error of as little as 250 microradians due to thermal expansion of the optical bench at one kilometer can result in the laser beam being off by more than the diameter of the beam itself. This problem obviously increases with an increase in the distance of the laser from the intended target.

The problem is even more complicated when, for instance, one laser pumps an optical parametric amplifier to produce multi-color radiation. When lateral off-setting occurs the different colored beams can come out at different angles.

SUMMARY OF THE INVENTION

Noting that for a given optical system including an optical bench and components mounted thereon there is a way of calculating lateral shift due to thermal expansion, then in the subject invention a mechanism is provided for physically shifting the lens such that the incoming beam of collimated light is made to come in on the centerline of the lens, as opposed to impinging on the lens at some lateral off-set.

Given the fact that within an optical system the lateral off-sets are calculatable, then in one embodiment, the lens or lens systems are mounted such that thermal expansion results in the shifting of the lens such that its centerline corresponds to the centerline of the off-set incident beam.

This shifting may be done by several techniques. The first technique is to mount the lens with a flexible mounting. An adhesive dot having a known thermal expansion characteristic is placed between the mounting fixture and the periphery of this lens. The adhesive dot is mounted at the edge of the lens to push the lens in a direction orthogonal to its optical axis. When the material utilized in this adhesive dot expands with rising temperature, the amount by which the lens is laterally-shifted off its original optical axis is made to correspond in position and direction to the calculated shift of the incident collimated beam. The result is that the collimated beam is made to come in on the optical centerline of the lens. This eliminates the problem associated with having the laterally off-set beam impinge on the lens away from the centerline of the lens.

If left uncompensated, an off-set beam impinging on a lens results in an angular error depending on where on the lens the beam impinges.

In one embodiment, two diametrically opposite adhesive dots are utilized to center the lens in a fixture, whereas the adhesive dot the expansion of which causes the lens to move is on a line orthogonal to the line between the diametrically opposed mounting dots.

In a second embodiment, the lens is supported in its fixture by two diametrically opposed adhesive dots, with the dots lying along a line corresponding to the direction of the calculated off-set. One of the dots, however, has an area larger than the other adhesive dot, and is greater in thickness than the other adhesive dot. This results in a differential movement due to thermal excursions, with the lens being shifted as dictated by the difference between the smaller and larger adhesive dots. In a preferred embodiment the adhesive dot performing the shifting is twice the area and twice the thickness of the diametrically opposite dot.

In yet another embodiment, the fixturing device which is itself affixed to the optical bench is made of a material having a coefficient of thermal expansion different from that of the optical bench. If the result of the expansion of the optical bench is such as to shift the incident optical beam in one direction, and if the thermal coefficient of expansion of the material of the fixture holding the lens is of a greater CTE than that of the optical bench, and assuming that the fixture is affixed to the optical bench at one end thereof, then the system is arranged such that with an of expansion of the optical bench in one direction, the fixture expands in a diametrically opposite direction, thus to shift the lens a proper direction and by an amount to canal the calculated lateral shift, thus to center the incident beam on the center of the lens.

In summary, a system is provided for nulling out or eliminating alignment errors in an optical system by moving a lens to capture and center a laterally-shifted collimated beam. Thus alignment error due to the thermal coefficient of expansion characteristics of the optical elements and their mounting systems caused by lateral off-sets is corrected by moving a lens or lens system in response to thermal changes in a direction which moves the lens so that the collimated light beam incident on the lens is made to come in on the optical axis of the lens.

While the focal point of the lens is not altered, the angular deflection of the incoming collimated beam is eliminated by moving the lens so that the collimated beam is centered on the lens.

In any given optical system the amount of lateral off-set caused by thermal expansion is calculatable, with a mounting system for the lens being configured such that as temperature changes, the mounting system moves the lens in a direction counter to the lateral off-set, thus to capture and center the collimated beam at the center of the lens. Three techniques are discussed for the movement of the lens in response to thermal changes. The first involves an adhesive dot at the periphery of the lens to push the lens in a direction perpendicular to the optical axis of the lens responsive to a temperature change. A second technique mounts the lens with a mounting dot to one side of the lens and a mounting dot on a diametrically opposite side of the lens which is twice the area of the first dot and twice the thickness. A third technique involves mounting the lens in a fixture having a pre-determined coefficient of thermal expansion which is larger than the coefficient of thermal expansion of the optical bench. In one embodiment, with the optical bench being made of aluminum and having a CTE of 24, a Delryn mounting fixture having a CTE of 60 expands faster in a direction opposite to that of the expansion of the aluminum, thus to cancel out the lateral off-set of the collimated beam by shifting the center of the lens in a direction opposite that of the off-set.

BRIEF DESCRIPTION OF THE DRAWINGS

These and other features of the subject invention will be better understood in connection with the Detailed Description in conjunction with drawings, of which.

DETAILED DESCRIPTION

Figure 1A:
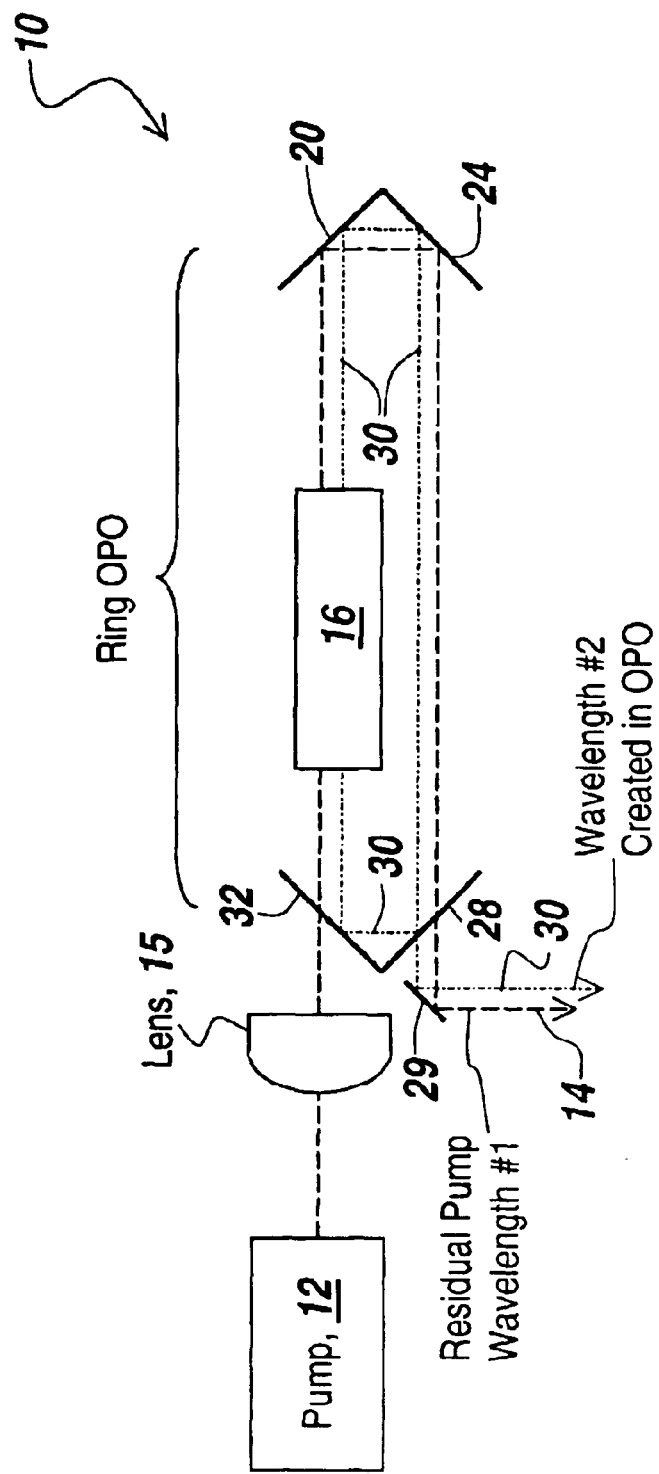
FIG. 1A is a block diagram of an optical system including a ring laser, indicating that with the proper alignment two differently colored beams come out perfectly aligned to the boresight axis.

Referring to FIG. 1A, in a typical multi-color ring laser 10 an optical pumping source 12 is utilized to direct a collimated beam 14 focused by a lens 15 at wavelength λ, through an optical parametric oscillator 16, the output of which is directed towards a mirror 24 and out through a beam splitting mirror 28 such that beam 14 is redirected by mirror 29, and comes out along the optical axis or boresight axis of the laser. Due to the pumping of the optical parametric oscillator a beam 30 of a second color or wavelength λ propagates around the ring using mirror 28 and 32. Note, with perfect alignment beams 14 and 30 exit along the boresight axis.

Figure 1B:
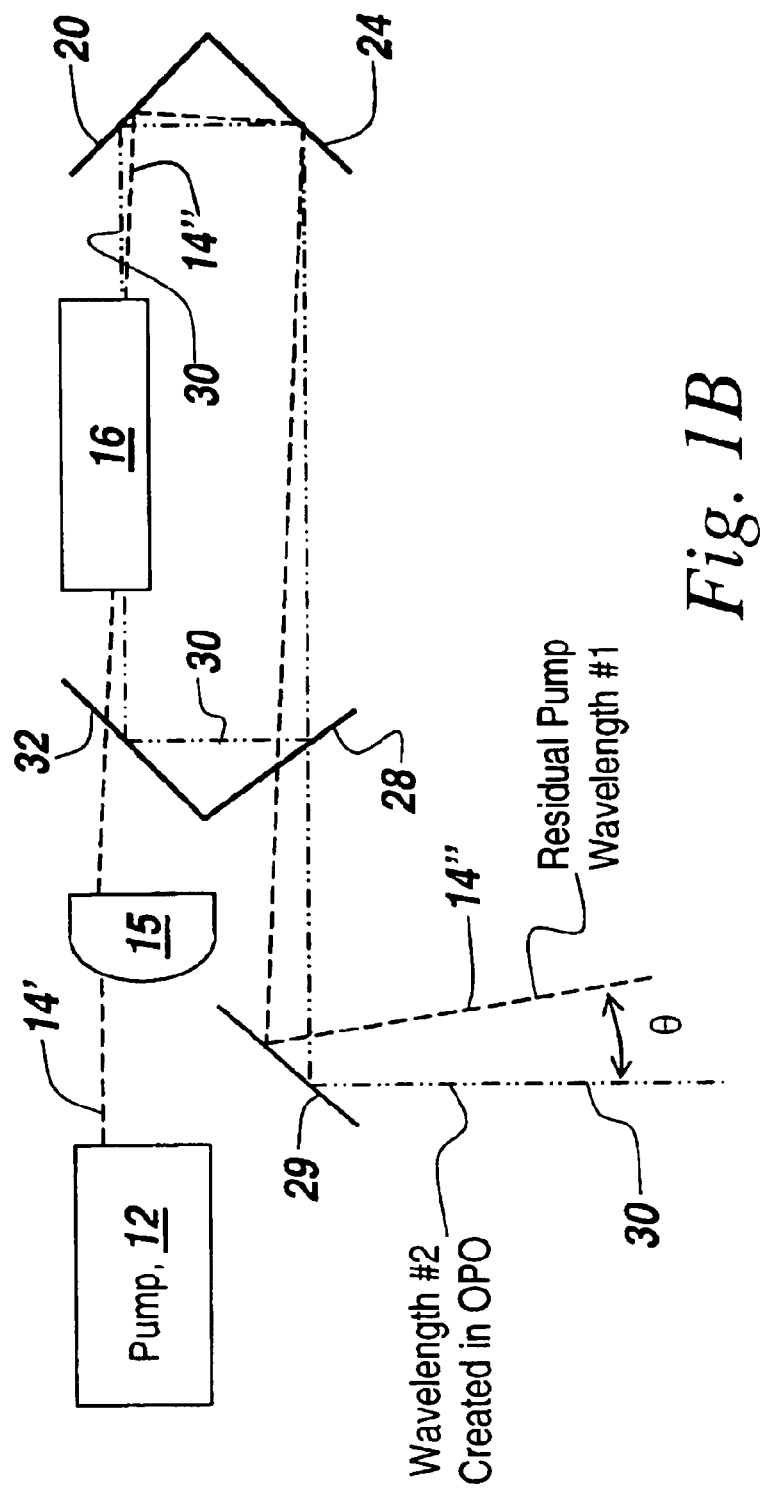
FIG. 1B is a block diagram of the system of FIG. 1A, showing a misalignment of one beam with respect to the boresight axis due to a lateral shift of the pumping beam on a focusing lens.

However, as shown in FIG. 1B, pump beam 14 may be is laterally off-set on lens 15 due to thermal expansions regardless of where the lateral shift occurs. When beam 14 is focused it is angularly displaced as illustrated at 14". After reflection, beam 14" comes out angularly displaced from beam 30. This angular error is referred to as boresight angle error or co-boresight angular error. This error is unrecoverable once the error is allowed to propagate past optical parametric oscillator 16.

The boresight or optical axis of the system is defined by optical axis established with initial alignment. It is important to be able to accurately establish that the collimated radiation from the laser is actually centered on this boresight axis, because any misalignments can cause the outputted collimated radiation to miss its target, or can result in decreased output power, the result of which again may be a missed target.

Much time and expense is incurred in initially aligning such things as optical range finders, lidars, ladars, and counter-measuring lasers so as to be able to accurately illuminate a target so as to either designate the target, measure the position and range of the target or to countermeasure electronics contained within the target. Additionally in some lasers it is important to be able to destroy the target with laser radiation.

In general all ordinances and laser projecting devices are initially aligned at room temperature so as to be able to accurately establish the direction of the output beam. In general, a great deal of effort is expended in designing the optical bench and the components carried by the bench, so as to be as insensitive as possible to thermal changes. However, those materials having extremely low coefficients of thermal expansion that might be used for structure or for optical substrates so as not to markedly contract or expand with changes of temperature are not suitable for most military and industrial instruments. This is true for a variety of design related reasons, including but not limited to high density, brittleness, difficulty in processing, high cost, and low thermal conductivity. Examples of such materials are Invar and Zerodur. As a result, an inexpensive yet reliable material for the optical bench housing the optical elements is normally Aluminum with a CTE of 24. With such a CTE, aluminum expands and contracts with temperature at a different rate than the optical substrate materials, thus causing misalignment of the various optical components mounted on the optical bench. This misalignment can be direct tilting of a reflective surface, which causes angular boresight error. This type of error usually cannot be calculated, only measured once the system components are built. Another type of error is lateral shifting of the beam, which can indirectly induce angle boresight error.

Another source of error has to do with slab lasers. In a slab laser, the temperature gradients in the slab caused by the less than perfect conversion efficiency in which some of the pump energy becomes waste heat can cause a lateral shift in the perceived center of the beam over temperature.

While thermal expansion characteristics of materials are well known, what is not so well known is the effect of off-setting of a collimated beam on a lens. This off-setting may be due to thermally-induced movement of a redirecting device; and the angular error caused by focusing the off-set beam can be significant. The reason angular deviation due to focusing laterally displaced beams is not normally considered is because those working with lenses normally consider the behavior they exhibit in imaging systems. The difference occurs because the lens is usually overfilled in an imaging system, but is underfilled in the laser system. This underfilling of the lens, combined with defining the center ray of the beam as passing through the energy centroid of the beam, means that the beam can be thought of as single ray as depicted in the figures herein.

Figure 2:
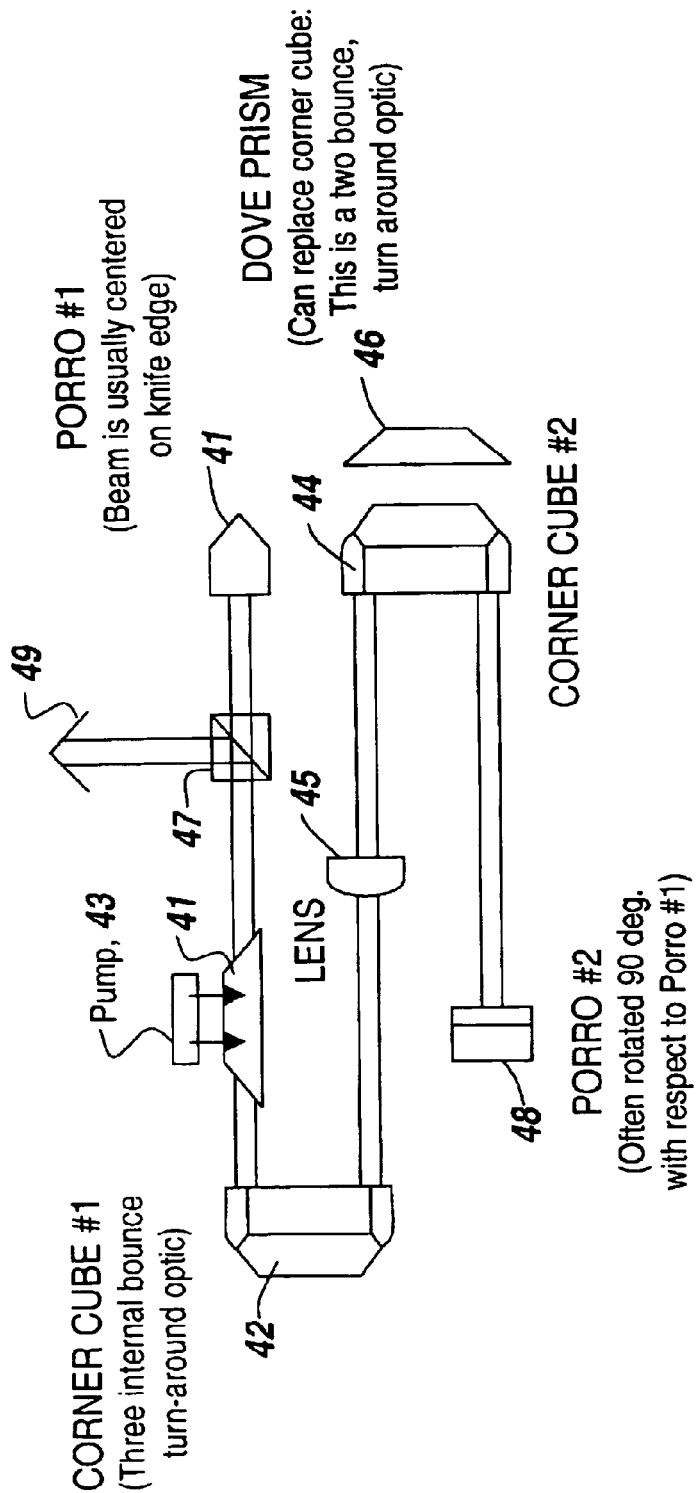
FIG. 2 is a diagrammatic illustration of a number of retroreflective devices used to provide a folded cavity in which the retroreflective devices include a corner prism, a Porro prism, and a Dove prism.

Referring to FIG. 2, redirecting devices commonly utilized for folding beams to minimize the size of a laser cavity include for instance a Porro prism 40 which redirects light impinging on it directly back towards the source of this light. A Porro device is usually designed to have the beam centered on its knife-edge 41, whereas for a corner cube, here illustrated al 42, there are 3 internal bounces to turn around the beam and have it come back in the same direction as the incident beam.

In a typical folded cavity an optical parametric oscillator crystal 42 is pumped by a pump 43. The result is that light emanates from both ends of the crystal into a folded laser cavity formed at one end by a Porro prism 40 and the other end by a Porro prism 48. Intermediate retroreflective devices such as corner cubes 42 and 44 or Dove prism 46 serve to fold the laser beam to shorten the overall size of the cavity. Typically, a lens 45 may be placed in the cavity and a beam splitter 47 is used to extract the output beam 49.

Any one of the retro-reflecting devices of FIG. 2 has a centerline. If the incoming beam is centered on the centerline, then the outgoing beam will be projected back along the centerline.

However, if the beam impinging on the retroreflective device is laterally off-set from the centerline of the device even by 0.001 inches, then the exiting beam although coming back along the same direction as the incident beam, comes back at a position laterally off-set from the centerline of the device by 0.002 inches. Thus if the corner cube is thermally-shifted by 0.001 inches, the exiting beam will be off-set by 0.002 inches.

This phenomenon is not well known or understood by those seeking to align optical systems. The result of not considering lateral shift of a redirected light beam is catastrophic in terms of the angular error associated when such a beam is focused with relatively short focal lengths, such as might occur with relay lenses, or compensation lenses within a laser cavity.

Figure 3:
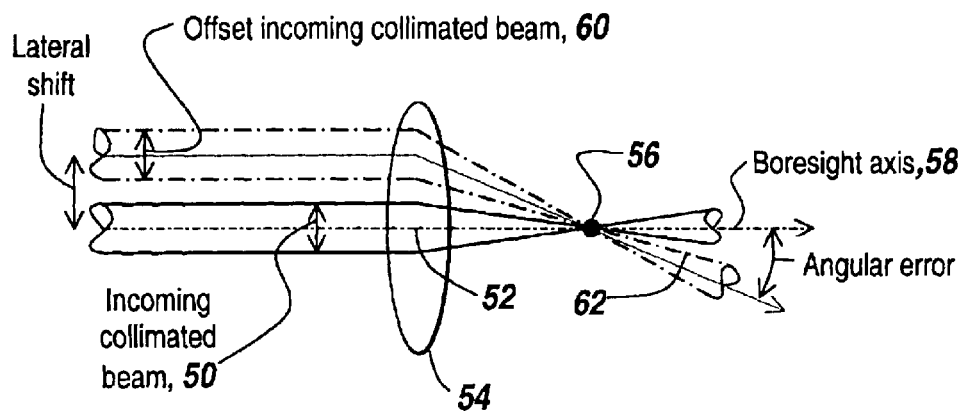
FIG. 3 is a diagrammatic illustration of the effect of off-setting an incoming collimated beam of light from the centerline of a lens illustrating that while the light is nonetheless focused at a pre-determined point, the direction of the beam is off-set by an angular error due to the lateral shift of the incoming beam from the centerline of the lens.

Referring now to FIG. 3, assuming that one has an incoming collimated beam 50 centered on the centerline 52 of a lens 54 focused at a point 56, then it can be seen that the light which is focused is centered around a boresight axis 58 which corresponds to the centerline of the lens.

Thus, if it can be established that an incoming collimated light beam is centered around the centerline of a lens, it can be established that the focused output beam is likewise centered about this centerline and therefore is centered about what is known as the boresight axis.

On the other hand, when an incoming collimated beam is off-set as illustrated at 60 such that it impinges on lens 54 at some distance from centerline 52, then while the collimated beam will in fact be focused at point 56, the direction of the focused beam as illustrated at 62 will be angularly off-set from the original boresight axis and therefore constitutes an angular error. Note that the angular error is exaggerated for illustrative purposes.

In a typical targeting system an output boresight error of 1000 microradians at a target distance of 3 kilometers will cause the beam to be aimed off-axis by as much as three meters or about 9 feet, thus potentially completely missing the intended target to be illuminated, for instance a tank or an air vent on a building. In a targeting or countermeasures system, the laser is typically allowed only a small portion of this error while operating over widely ranging environmental conditions, for instance 250 microradians. All the internal components as well as the whole structure contribute to this total allowable laser error. If this budget is exceeded, the angular error can be significant in the aiming of the output of a laser system and with a single lens 54, laterally off-set for instance 0.0005 inches (one half thousandth of an inch) in a typical situation for a focal length of two inches at for instance six kilometers, the angular error can be the entire angular boresight error budget of 250 microradians, thus potentially causing the system to completely miss the intended target.

In optical systems there are usually a number of focusing lenses or lens systems which focus the collimated light for a variety of purposes. Even in those systems which do not have focusing lenses, if the laser cavities are established by curved mirrors, as they often are, this is a focusing function. If collimated light is meant to impinge on the curved mirrors along a centerline, if it is off-set, a number of deleterious effects can occur, either in the generation of the laser radiation itself, or in angular errors of the exiting beam.

Also as illustrated in FIG. 1B for multi-color laser beams it is important that all of the multi-color beams be aligned along the boresight axis. It is important, therefore, to be able to make sure that all of the multi-color beams exiting the particular laser are aligned one on top of the other along a common axis. If there are any lateral off-sets prior to focusing, the result is that different colored beams will exit with exit at different angles.

Figure 4:
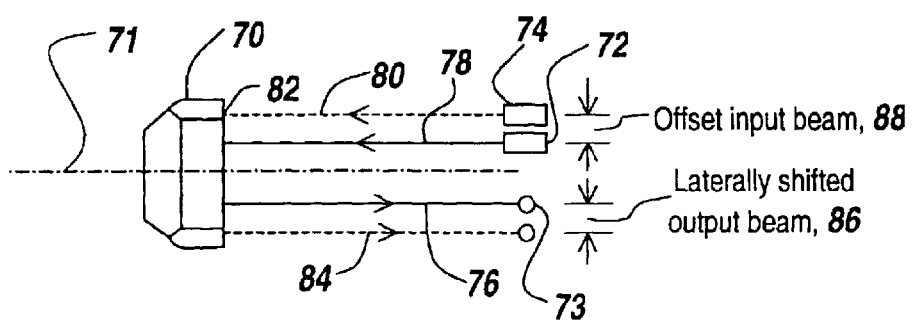
FIG. 4 is a diagrammatic illustration of the off-set of a collimated light beam incident on a corner cube in which if the light beam is moved off the optical centerline of the corner cube as by movement of the corner cube, the returned beam is off-set from the corner cube centerline.

Referring to FIG. 4, one way in which lateral shifts occur can be seen in terms of corner cube 70 having an optical centerline 71 and the illumination thereof with a collimated beam from a source 72 off-set from centerline 71. This results in an output at 73 as illustrated by beam 76. If the corner cube is illuminated with a source 74 further off-set from the centerline of the cube by 0.00025 inches, then the exiting beam 84 will be laterally off-set by 0.0005 inches as illustrated at 86. This is equivalent to having a stable and stationary source and having the corner cube move 0.00025 inches. Here, with the corner cube used as a turn-around optic as opposed to a retro-reflector, an incoming collimated beam 78 from source 72 is reflected back parallel to the centerline at an anticipated lateral offset, as illustrated by beam 76. However, for a beam 80 impinging on corner cube 70 at a point 82 off-set from the centerline of the cube, the result is a beam 84 exiting corner cube 70 in a direction parallel to the centerline of the corner cube but off-set from beam 76 as illustrated by double-ended arrow 86. Thus, while source 74 is off-set by an amount illustrated by 88, this engenders a lateral off-set from the centerline of the corner cube. As indicated in FIG. 3 this results in angular boresight errors.

Note that the output lateral shift is the sum of the input lateral shift and the output shift is simply twice the input off-set.

Figure 5:
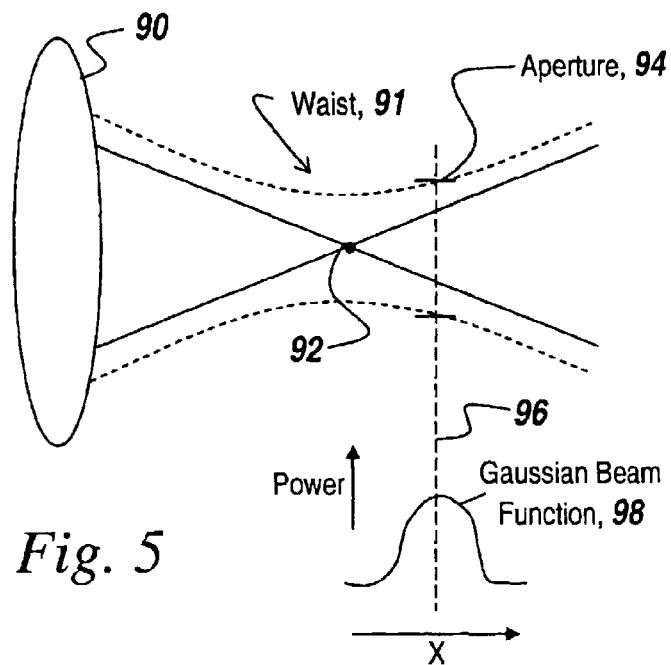
FIG. 5 is a diagrammatic illustration of the waist associated with a focused collimated beam illustrating a Gaussian beam distribution function of power versus position for an aperture positioned after the focal point of the lens.

Referring to FIG. 5, in countermeasure situations as well as others it is important to be able to concentrate a significant amount of power on target and this power is measured after it has been focused by a lens 90 through a point 92. Note that the beam exterior limits are described by a waist 91 narrowing at focal point 92. Assuming an aperture 94 illustrated by dotted line 96, a Gaussian beam distribution function 98 describes power versus position of the exiting beam.

Figure 6:
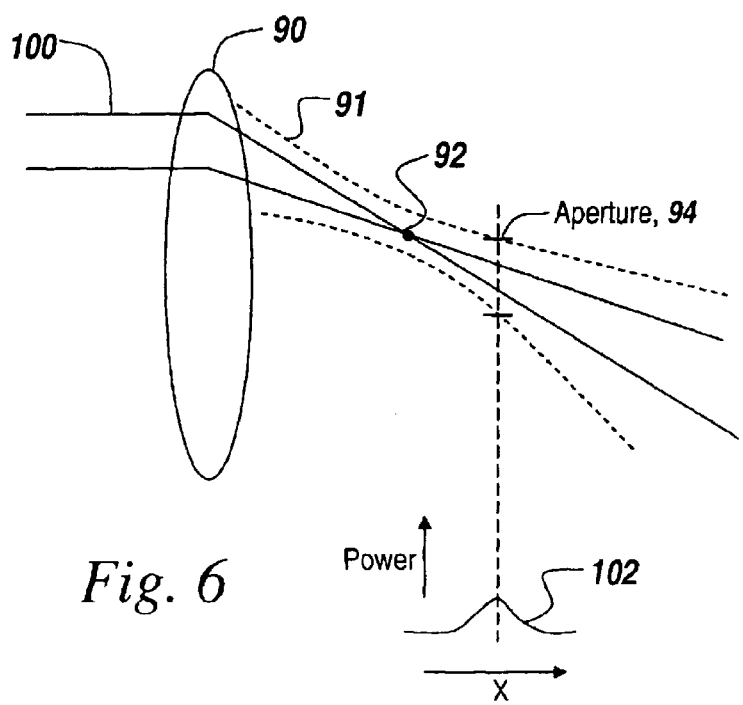
FIG. 6 is a diagrammatic illustration of the waist of FIG. 5 when the incoming beam is off-set from the centerline of the lens, illustrating a distorted Gaussian beam distribution function in terms of power, indicating the resulting deleterious effect in addition to engendering angular boresight error.

Referring to FIG. 6, if an incoming beam 100 is off-set as illustrated vis a vis the centerline of lens 90, waist 91 is narrower as illustrated at 91'. Then as can be seen the exiting beam at aperture 94 is narrower and contains less energy as illustrated by Gaussian distribution 102.

What will be seen is that not only is angular alignment important, misalignment due to lateral shifts of the incident beam on a lens also decreases output power due to the decreased Gaussian distribution.

Figure 7:
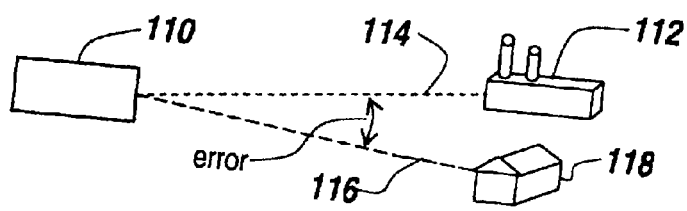
FIG. 7 is a diagrammatic illustration of a situation in which a laser target designator is utilized to illuminate a factory which because of alignment errors in fact illuminates an adjacent school.

Referring to FIG. 7, the import of the above can be seen when a laser target designator 110 is utilized to illuminate a factory stack 112 at, for instance, 10 kilometers from the laser target designator. The established direction from the laser target designator to the factory tower as illustrated by dotted line 114. This direction may obtained by an optical telescope having cross hairs which define this direction. However, if one attempts to project a beam along line 114 and the laser target designator is not properly aligned, then any angular error may result in a beam 116 angularly off-set from line 114. In an outside case, beam 116 may actually illuminate a school 118, obviously an undesired result.

Figure 8:
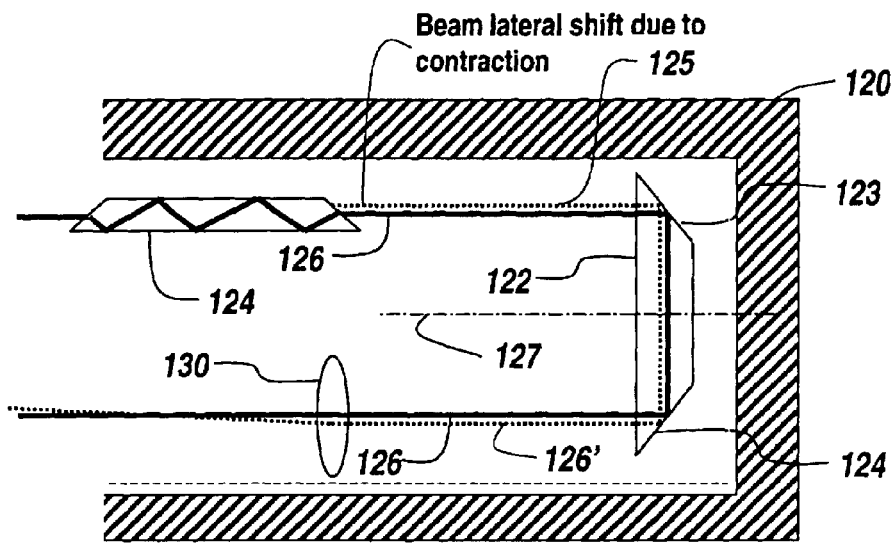
FIG. 8 is a diagrammatic illustration of the lateral shifting of a beam from a multi-bounce slab crystal due to slab contraction with decreased temperature; with the lateral off-set resulting in an angular error when the beam is focused.

How this angular off-setting can occur in a laser system is illustrated in FIG. 8 in which an optical bench 120 houses a Dove prism 123. Deformation or contraction over temperature of a multi-bounce slab crystal 124 will result in lateral beam displacement as shown at 125 as opposed to an un-shifted beam 126. This beam is shifted due to contraction of slab 124 with decreased temperature. Furthermore, this lateral displacement will be transferred to the next optical leg by the dove prism or corner cube turn-around optic. The result is an off-set or laterally-shifted beam 126' laterally-shifted from beam 126 which impinges on lens 130 at a point removed from the optical axis thereof. This results in the angular error shown.

Figure 9:
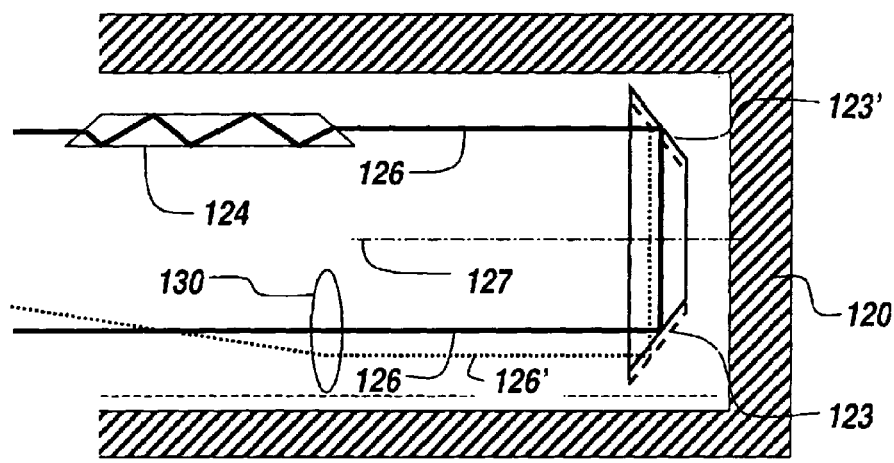
FIG. 9 is a diagrammatic illustration of the system of FIG. 8 in which a Dove prism or a corner cube is displaced inwardly due to contraction of the optical bench, showing the magnification of the lateral shift and thus angular error in the focused beam.

Referring to FIG. 9, likewise if the corner cube or Dove prism here shown in dotted outline at 123 is attached to a side of optical bench 120, or in any other way is to be mounted asymmetrically with respect to centerline 127, then movement of optical bench 120 can cause upward movement of prism 123 relative to on centerline 127 as illustrated by the solid line 123". As a result there will be a lateral shift of the output beam 126 as illustrated at 126' with respect to the optical axis of lens 130, and that lateral shift will be twice the motion of the prism or corner cube. The result is the angular shift shown after focusing.

Figure 10:
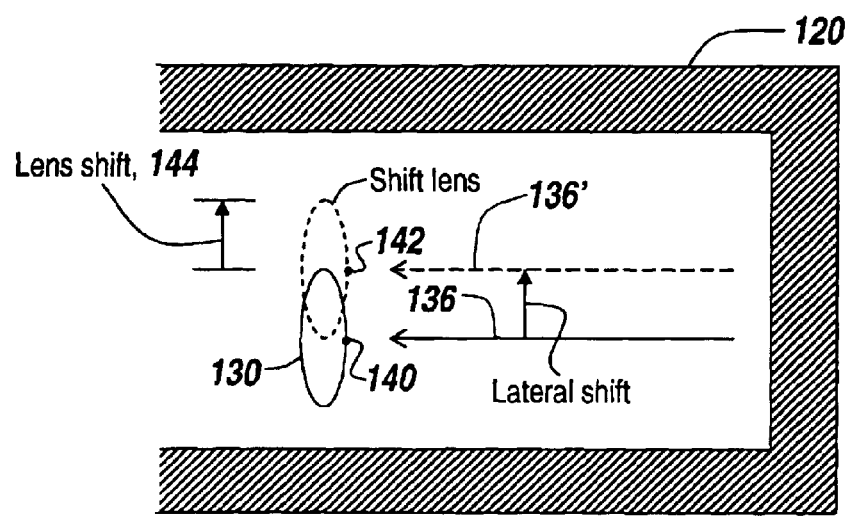
FIG. 10 is a diagrammatic illustration of the subject invention in which angular errors are eliminated or reduced through the movement or shifting of the lens by an amount so as to accommodate a calculated lateral shift so that the lens captures the impinging beam along the optical centerline of the lens, thus eliminating angular errors and power diminution.

As illustrated at FIG. 10, rather than attempting to compensate for the coefficient of thermal expansion of the material utilized in the optical bench, the lens fixture or holder, or the lens itself, in the subject invention lens 130 is moved as illustrated by dotted line 130" to a position to intersect the calculated off-set collimated beam 136' such that with a temperature change lens 130 is moved so that its center 142 is centered on the off-set beam. As will be seen, if there is a calculatable lateral shift, there are a number of techniques that can be utilized to shift the lens in the appropriate direction as indicated by lens shift arrow 144.

Figure 11:
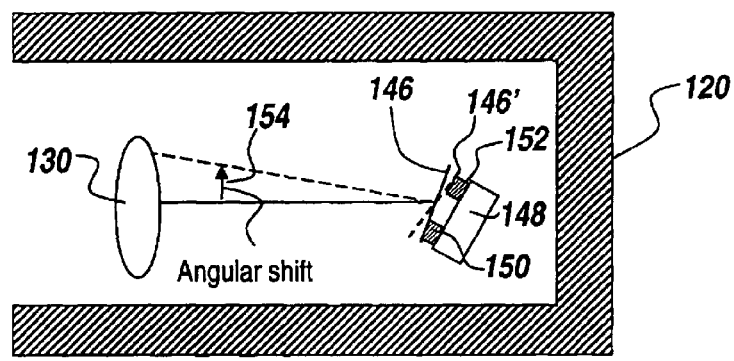
FIG. 11 is a diagrammatic illustration of an optical bench mounting a mirror in which mirror mounting adhesive dots result in a canting of the mirror with a temperature shift causing a direct angular shift in the beam impinging on a lens.

Prior to describing the lens shifting apparatus, referring to FIG. 11, if for instance a mirror 146 is mounted to a fixture 148 by adhesive dots 150 and 152, then with a thermal excursion, the mirror may be shifted as illustrated by 146" so as to create a virtual lateral shift indicated by arrow 154 vis a vis lens 130. What this means is that not only may the lateral shift be occasioned by the movement of such elements as a corner cube or prism which would laterally off-set the exiting beam, a beam may be laterally off-set by a number of other calculatable mechanisms the net result of which is a lateral shift of the beam impinging on a particular lens or lens system.

Figure 12:
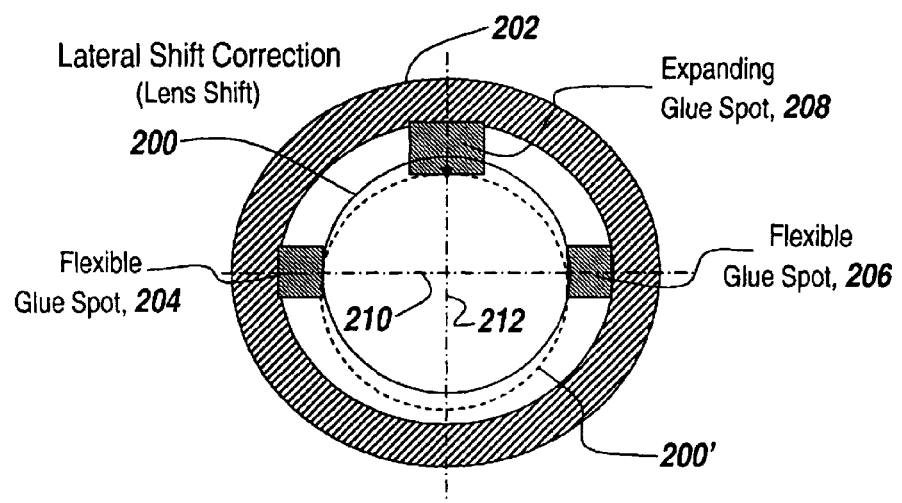
FIG. 12 is a cross-sectional illustration of the mounting of a lens in a ring by flexible adhesive dots or spots at diametrically opposite edges of the lens, with movement of the lens in a direction orthogonal to the axis between the flexible adhesive dots being accomplished by the expansion or contraction of an adhesive dot which contacts the periphery of the lens so as to move the lens in a direction opposite to the calculated lateral shift of an impinging collimated beam, thus to center the laterally-shifted beam on the centerline of the lens.

Assuming that the lateral shift can be calculated no matter how the lateral shift is produced, and referring now to FIG. 12, one method of shifting a lens so that it captures and is centered on a laterally-shifted beam includes lens 200 mounted to a ring 202 by diametrically opposed flexible adhesive dots 204 and 206. A third adhesive dot 208, having a predetermined CTE, size and shape contacts a portion of lens 200 at a point orthogonal to the line 210 between the flexible adhesive dots. Thus, the orthogonally positioned adhesive dot 208 is located along a line 212 orthogonal to line 210.

This expanding or contracting adhesive dot 208 is made of such a material as to move lens 200, for instance, to a position 200' when temperature increases and adhesive dot 208 expands.

This expansion is designed to move lens 200 by an amount corresponding to the calculated lateral shift of the incoming collimated light beam so as to move lens 200 to capture and center the collimated incoming light beam.

In one embodiment, adhesive dot 208 is made of polyurethane and has a thickness of 0.090 in. and a width of 0.150 with a CTE of 90E-6 ppm/° C. so as to accommodate a calculated shift of 0.0005 inches (one half thousandth of an inch) for a thermal shift from ambient of 20° C. to a measurement temperature of −40° C., or a total downward shift of 60° C. For the case of a 0.090 inch thick spot of adhesive, the bulk of the adhesive might be contained in a counterbore hole so the incompressible adhesive fully acts as a linear actuator extruding outward along the required axis of movement.

Figure 13A:
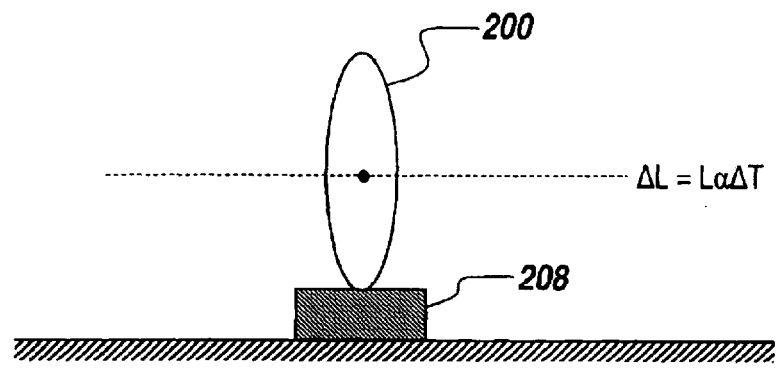
FIG. 13A is a diagrammatic illustration of a lens having its periphery contacted by an adhesive dot having a CTE which results in the movement of the lens in accordance with the expansion or contraction of the adhesive dot.
Figure 13B:
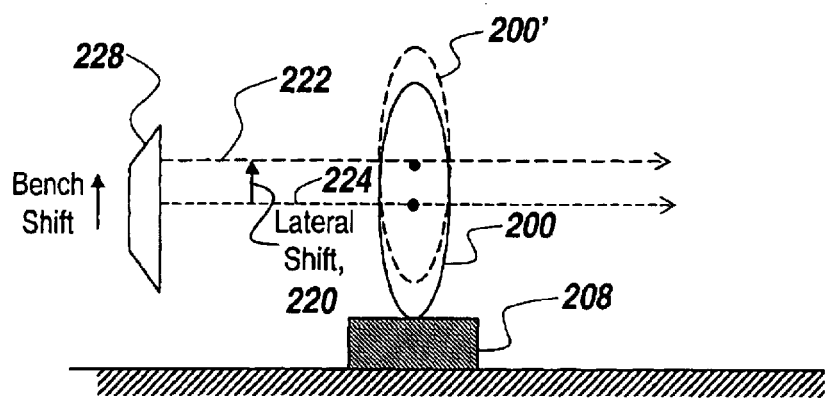
FIG. 13B is a diagrammatic illustration of the lens and adhesive dot of FIG. 13A, illustrating that with a shift of a corner cube, a lateral shift occurs for the output beam, with the laterally-shifted beam being centered on the lens through the movement of the lens in an upward direction so as to center the output beam on the centerline of the lens.

As illustrated in 13A, lens 200 is to be moved by adhesive dot 208 an amount $\Delta L = L\alpha\Delta T$. As can be seen from FIG. 13B this accommodates a lateral shift 220 of a beam 222 from an initial centerline 224 due to movement of an optical element 228, with the required movement of lens 200 being that shown by dotted line 200".

Figure 14:
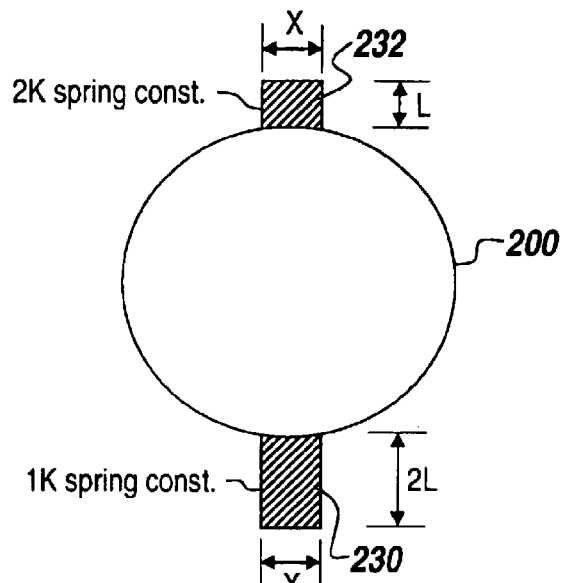
FIG. 14 is a diagrammatic illustration of an attempt to move a lens by increasing the thickness of one of two diametrically opposed adhesive dots, illustrating the fact that merely thickening one of the adhesive dots without increasing its area decreases its spring constant proportionally to the increase in length, and therefore does not result in movement of the lens.

Referring to FIG. 14, it might be thought that by providing diametrically opposite adhesive dots 230 and 232 with differing widths, one could achieve lens motion. However, it will be appreciated that if one doubles the width of adhesive dot 230, its spring constant will be ½ of that of adhesive dot 232, and thus no movement of the lens will occur, assuming both dots are made of the same material.

Figure 15:
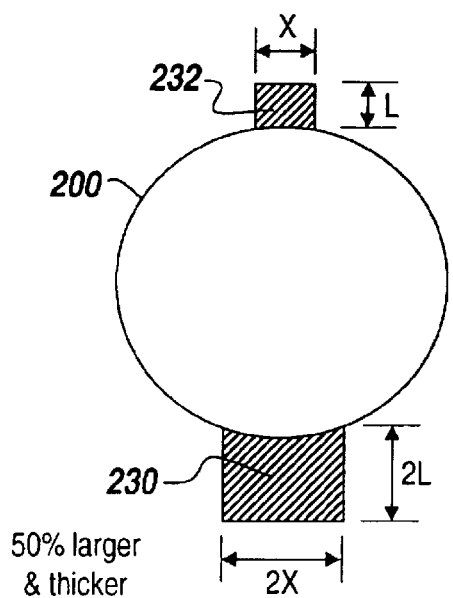
FIG. 15 is a diagrammatic illustration of a lens supported on diametrically opposite sides by adhesive dots in which one of the adhesive dots is 50% larger and 50% thicker than the other of the adhesive dots, thus to engender movement of the lens with thermal changes.

Referring, however, to FIG. 15; if adhesive dot 230 in addition to having twice the thickness of dot 232 now is provided with a width of twice that of dot 232, then adhesive dot 230 will be 50% larger and thicker and thus result in movement of the lens.

Figure 16:
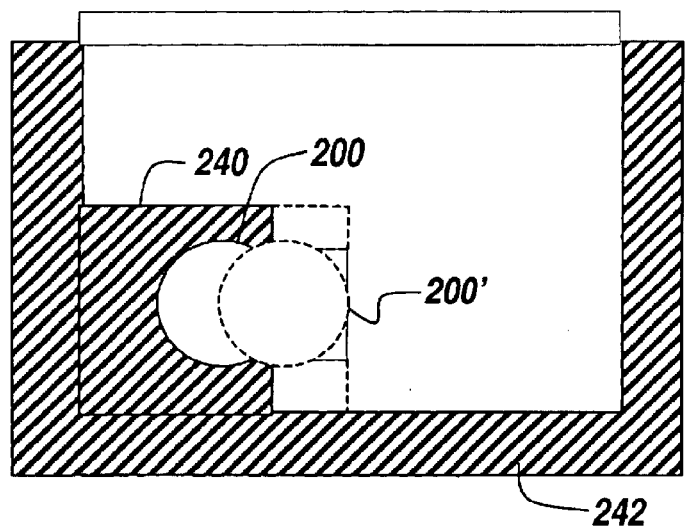
FIG. 16 is a diagrammatic illustration of the movement of a lens mounted in a fixture of the same material as the optical bench with thermal contraction of the optical bench and associated fixture resulting in the movement of the lens in the direction of the contraction.

Referring to FIG. 16, it will be appreciated that if lens 200 is captured in a fixture or holder 240 of the same material as the optical bench here shown at 242, then with shrinking of the optical bench due to a decrease in temperature, lens 200 will move inwardly as illustrated by dotted line 200".

Figure 17:
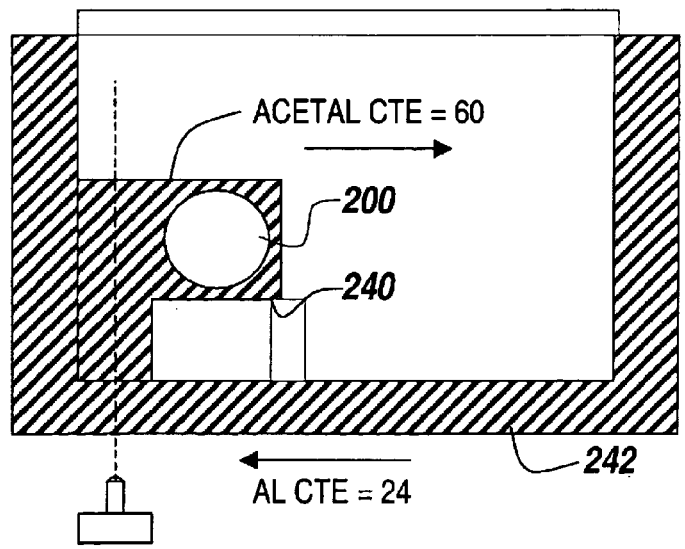
FIG. 17 is a diagrammatic illustration of the utilization of a fixture or holding device for the lens of FIG. 16 having a CTE which is significantly larger than the CTE of the optical bench, in which movement of the optical bench in one direction causes a magnified movement of the lens in an opposite direction, thus to cancel out the effect of a temperature change by providing a material of sufficiently different CTE to move the lens in a direction opposite to that associated with expansion or contraction of the optical bench.

However, and as illustrated in FIG. 17, if the holder or fixture 240 is made of a material having a CTE much greater than that of the optical bench, then as the optical bench moves in one direction, as illustrated, lens 200 will move in an opposite direction. As part of the subject invention one can design the system such that the movement of the holder or fixture cancels out the calculated shift. For instance, if holder or fixture 240 is made from Delryn, having a CTE equal to 60 and assuming that the optical bench 242 is made of aluminum, then there is a significant difference in the CTE of the older fixture as opposed to the optical bench. This can be designed in such a way that the movement of the lens engendered by the holder or fixture is equal to and opposite that of the movement calculated as a result of the particular optical bench material.

In short, either the lens or lens system can be moved so as to center and capture the incoming shifted collimated light beam, or the fixture or holder for the optical element other than the lens may be made so as to counter-shift it so as to keep the lens centered along the incoming light beam.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for eliminating angular alignment errors in an optical system employing collimated light beams which may be laterally off-set due to temperature excursions from the temperature at which said system was aligned, comprising:
    a lens for focusing a collimated light beam incident on said lens to a focal point; and,
    a lens mount for moving said lens by an amount opposite to said lateral off-set so that said lens captures said beam and provides that it come in on the optical centerline of said lens.

2. The system of claim 1, wherein said lens mount includes an adhesive dot contacting the periphery of said lens so as to move said lens with the expansion and contraction of said dot with excursions of temperature.

3. The system of claim 2, wherein said dot has a coefficient of thermal expansion designed to move said lens in a direction opposite to said lateral off-set.

4. The system of claim 3, wherein said dot moves said lens by an amount equal to said lateral off-set.

5. The system of claim 4, and further including an adhesive dot located on a diametrically opposite side of said lens from said first-mentioned dot.

6. The system of claim 5, wherein said dots have different volumes.

7. The system of claim 6, wherein said first-mentioned dot has a diameter and thickness twice that of said second-mentioned dot.

8. The system of claim 1, wherein said optical system includes an optical bench having a predetermined coefficient of thermal expansion and wherein said lens mount includes a holder mounted to said optical bench at one end thereof and having a coefficient of thermal expansion higher than that of said optical bench.

9. The system of claim 8, wherein movement of said holder with temperature variation is opposite to that of said optical bench with said temperature variation.

10. A method of minimizing alignment errors in an optical system providing a collimated light beam impinging on a lens, the beam having been laterally-shifted from an originally aligned position on the optical centerline of the lens, comprising the step of moving the lens in response to temperature changes such that the centerline of the lens corresponds to the centerline of the laterally-shifted beam.

11. The method of claim 10, wherein the optical system includes a laser.

12. The method of claim 11, wherein the laser is a multi-color laser and wherein the movement of the lens assures all of the multi-colored beams produced by the laser come out aligned with the optical centerline of the lens.

13. The method of claim 10, wherein the lens includes a number of optical elements.

14. A method of preserving initial alignment of an optical system which projects a collimated laser beam toward a target indicated as being on a boresight axis so as to minimize angular boresight error the result of temperature changes, comprising the steps of:
    initially aligning all of the elements in the optical system at one temperature such that any collimated beam impinging on a lens in the system comes along the optical axis of the lens, temperature changes from the initialization temperature causing a lateral shift of the collimated beam from the optical axis of the lens; and,
    moving the lens in response to a temperature change from the initialization temperature so as to align the centerline of the lens with that of the off-set beam, thus to null out any angular alignment error caused by the lateral off-set.

* * * * *